United States Patent [19]
Kim

[11] Patent Number: 5,757,439
[45] Date of Patent: May 26, 1998

[54] METHOD FOR DETECTING COLOR BURST SIGNAL AMPLITUDE FOR CHROMINANCE SIGNAL LEVEL CONTROL AND AN APPARATUS THEREFOR

[75] Inventor: Dong-ha Kim, Seoul, Rep. of Korea

[73] Assignee: Samsung Electronics Co., Ltd., Kyungki-do, Rep. of Korea

[21] Appl. No.: 156,907

[22] Filed: Nov. 24, 1993

[30] Foreign Application Priority Data

Nov. 24, 1992 [KR] Rep. of Korea ............... 92-22179

[51] Int. Cl.$^6$ ............................................. H04N 9/68
[52] U.S. Cl. ............................. 348/645; 348/648
[58] Field of Search ........................... 348/645–648; H04N 9/68

[56] References Cited

U.S. PATENT DOCUMENTS

| | | | |
|---|---|---|---|
| 4,466,015 | 8/1984 | Wargo et al. | 348/646 |
| 4,686,520 | 8/1987 | Yamaoka | 348/642 |
| 5,233,410 | 8/1993 | Fairhurst | 348/645 |

FOREIGN PATENT DOCUMENTS

| | | | |
|---|---|---|---|
| 630428 | 2/1994 | Japan | H04N 9/68 |
| 573295 | 12/1993 | United Kingdom | H04N 9/68 |

OTHER PUBLICATIONS

Benson, Blair, "Television Engineering Handbook", McGraw–Hill Book Company, 1986, pp. 13.144–13.145, 13.23, 21.50–21.51.

*Primary Examiner*—John K. Peng
*Assistant Examiner*—Nathan J. Flynn
*Attorney, Agent, or Firm*—Sughrue, Mion, Zinn, Macpeak & Seas, PLLC

[57] ABSTRACT

A method for detecting color burst signal amplitude of a composite color image signal for use in an automatic color control circuit includes the steps of separating the burst signal loaded on the chrominance signal into first and second chrominance reference signals having a predetermined phase difference with respect to each other using a carrier signal having an arbitrary burst signal, detecting the squared components of the separated first and second chrominance reference signals respectively, and outputting the amplitude value of the burst signal using a composite signal of the squared components of the detected first and second chrominance reference signals. An apparatus using this method can detect the level of the burst signal regardless of the phase difference between the burst signal and the demodulated carrier.

20 Claims, 6 Drawing Sheets

METHOD FOR DETECTING COLOR BURST SIGNAL AMPLITUDE FOR CHROMINANCE SIGNAL LEVEL CONTROL AND AN APPARATUS THEREFOR

FIELD OF THE INVENTION

The present invention relates to a method for detecting color burst signal amplitude for an automatic color control (ACC) circuit and, more particularly, to a method for detecting color burst signal amplitude, regardless of a phase difference between the color burst signal and the demodulated carrier. An apparatus adapted for detecting color burst signal amplitude, irrespective of phase difference with respect to the carrier, is also disclosed.

Korean Patent Application No. 92-22179 is incorporated herein for all purposes by reference.

BACKGROUND OF THE INVENTION

In general, the color saturation of a color image depends on the input level of the color signal. An ACC circuit automatically controls the amplitude (gain) of a color signal, so as to maintain a constant color saturation.

A color signal is transmitted by being modulated into a color difference signal. Such a color signal can be transmitted by being modulated into I and Q signals having phase differences of 47° and 237°, respectively, in relation to the color burst signal. The color difference signal varies depending upon conditions, e.g., variations in transmission lines due to interference (noise), antenna mismatch, etc. Moreover, even differences in the frequency characteristics of the tuner circuit can cause variations from receiver to receiver.

An ACC circuit is necessary for maintaining approximately the same level in the carrier color signal input to the color demodulation circuit to offset for these varying conditions. The ACC circuit detects the amplitude of a reference signal and, if the reference level is lower than a nominal value, the ACC circuit controls the amplification of the color difference signal accordingly.

The color information for a color television is divided into a color burst signal and a color signal carrier. Of these two signals, the carrier color signal cannot be used for obtaining the proper level of the color signal, which is a must for ACC operation, because it varies with variations in picture content. On the other hand, the level of color burst signal varies little with picture content, making it useful as a reference signal.

In a digital image processing apparatus, all internal signal processing is carried out digitally. Therefore, to provide the ACC circuit in a digital form, the reference signal, i.e., the color burst signal, is sampled to obtain its amplitude. However, since the burst signal is a 3.58 MHz sinusoidal wave signal, accurate sampling is difficult.

The conventional apparatus for detecting the amplitude of a color burst signal multiplies the received burst signal by a sine wave and cosine wave, each having the same frequency (e.g., 3.58 MHz for NTSC systems) as the burst signal, to thereby obtain two color difference components R-Y and B-Y. These multiplied results are converted into respective DC components by means of a low-pass filter (not represented). Here, the low-pass-filtered R-Y and B-Y signals become DC values so that the sampling processing can be simplified.

In the conventional apparatus for detecting burst signal amplitude, however, if the sine wave and the cosine wave, both of which should be multiplied by the burst signal, are not in phase with the burst signal, an error is produced due to this phase difference. Therefore, the low-pass-filtered R-Y and B-Y signals do not have the proper amplitude, resulting in instability, i.e., oscillations, in the ACC circuit.

An apparatus for controlling the amplitude of a burst signal is disclosed in U.S. Pat. No. 4,466,015, which apparatus is not affected by changes in the phase of the sampled signal (burst signal) while determining the level of the color signal. This apparatus samples the burst signal of the I and Q signals, which are demodulated by a chrominance signal amplifier, in accordance with sampling pulses having 90° phase differences with respect to each other. Here, a difference value, i.e., error signal, between the sampling results of the I and Q signals is used to control the gain of the chrominance signal amplifier.

The sampling pulse of the above-described apparatus is always locked at the quadrupled frequency ($4f_{sc}$) of the burst signal, and an I-sampling clock and Q-sampling clock having a 90° phase difference with respect to each other. The I-signal and Q-signals are then averaged and the averaged value is used as an address to access a ROM. At this point, the chrominance signal amplitude is controlled using the error signal, i.e., the three bit error code signal stored in the ROM and accessed by the input I-signal and Q-signal average values. In such an apparatus, the frequency of the system clock is restricted to a multiple of the burst signal.

However, at present, not all video apparatuses such as NTSC and PAL televisions and 8 mm VCRs have system clocks of the proper frequency, e.g., a multiple of the burst signal and, thus, the gain controlling apparatus is incompatible with many systems.

SUMMARY OF THE INVENTION

The principal object of the present invention is to provide a method by which the amplitude of the color burst signal can be accurately determined by a simple manipulation.

An object of the present invention is to provide a method for accurately determining the amplitude of the color burst signal using a simple manipulation procedure, wherein amplitude can be determined even in the event of phase errors.

Another object of the present invention is to provide an amplitude detection method which can be applied to any digital image apparatus using a clock signal whose frequency is any multiple of the burst signal.

Yet another object of the present invention is to provide an amplitude detection method which can be applied to any digital image apparatus using an arbitrary system clock frequency.

Still another object of the present invention is to provide a method for separating the burst signal into first and second chrominance reference signals by using the carrier signal of an arbitrary frequency, and thereby using the amplitudes of the separated signals to detect the level of the color burst signal regardless of the phase difference between the burst signal and the demodulated carrier signal.

Another object of the present invention is to provide an apparatus suitable to the above method for detecting the level of the color burst signal.

An additional object of the present invention is to provide an apparatus for detecting the level of the color burst signal, which is suitable to an automatic color control circuit of a digital video apparatus using the system clock having the arbitrary frequency obtained by multiplying the color burst signal by a carrier signal of an arbitrary frequency, and then squaring the multiplied value, and the method therefor.

These and other objects, features and advantages of the present invention are provided by a method including steps for determining each squared value of the low-pass-filtered R-Y and B-Y signals, adding the two squared signals together and utilizing the sum of the two squared signals.

These and other objects, features and advantages are provided by a method for detecting color burst signal amplitude by controlling the level of the chrominance signal based on the level of the burst signal loaded thereon. The method includes steps for (a) separating a burst signal into a first chrominance reference signal and a second chrominance reference signal having a predetermined phase difference with respect to each other, using a carrier signal having an arbitrary frequency, (b) generating respective first and second squared components of the first and second chrominance reference signals, separated in step (a), and (c) producing an amplitude value of the burst signal based on a composite signal formed from the first and second squared components obtained in step (b).

These and other objects, features and advantages are provided by an apparatus for detecting color burst signal amplitude by controlling the level of the chrominance signal based on the level of the burst signal loaded thereon. The apparatus includes a separator for separating the burst signal into a first chrominance reference signal and a second chrominance reference signal having a predetermined phase difference with respect to each other, using a carrier signal having an arbitrary frequency, a detector for detecting squared components of the first and second chrominance reference signals which are separated by the separating means, and an output circuit producing the amplitude value of the burst signal by using a composite signal of the squared components.

These and other objects, features and advantages of the invention are disclosed in or apparent from the following description of preferred embodiments.

BRIEF DESCRIPTION OF THE DRAWINGS

The above object and other advantages of the present invention will become more apparent by describing in detail a preferred embodiment of the present invention with reference to the attached drawings in which:

FIG. 3A shows the data of the carrier signal at sampling points, while

Preferred embodiments of a method for detecting color burst signal amplitude according to the present invention and the apparatus therefor will be described hereinbelow with reference to the attached drawings.

DETAILED DESCRIPTION OF THE PREFERRED EMBODIMENTS

Before discussing the present invention, the conventional method for detecting color burst signal amplitude will be briefly described for better understanding of the present invention.

In the NTSC system, the color burst signal $E_b$ is expressed as:

$$E_b = A \sin(2\pi f_{sc} t + \pi) \tag{1}$$

Given that the B-Y color difference signal is a cosine component of $E_b$, the B-Y signal can be obtained by multiplying the signal $E_b$ by a sine wave (sinusoidal wave) having the same frequency as that of the burst signal, which is namely a first carrier signal for demodulation, and then performing a low-pass-filtering operation to the result of the multiplication. That is, $$\begin{aligned}(B-Y)' &= E_b 2\sin(2\pi f_{sc} t + \theta) \\ &= A\sin(2\pi f_{sc} t + \pi) \times 2\sin(2\pi f_{sc} t + \theta) \\ &= A\cos(\pi - \theta) - A\cos(2 \cdot 2\pi f_{sc} t + \pi\theta)\end{aligned} \tag{2}$$

Then, the second term of the right side of the bottom equation is removed from Equation (2) via low-pass-filtering (not represented), which thereby results in a new B-Y value as shown in Equation (3).

$$(B-Y)' = A \cos(\pi - \theta) \tag{3}$$

Here, only the cosine component appears.

Similarly, given that the R-Y color difference signal is a sine component of $E_b$, the R-Y signal can be obtained by multiplying the signal $E_b$ by a cosine wave having the same frequency as that of the burst signal, which is namely a second carrier signal for demodulation, and then performing a low-pass-filtering operation to the result of the multiplication. That is, $$\begin{aligned}(R-Y)' &= E_b 2\sin(2\pi f_{sc} t + \theta) \\ &= A\sin(2\pi f_{sc} t + \pi) \times 2\sin(2\pi f_{sc} t + \theta) \\ &= A\cos(\pi - \theta) - A\cos(2 \cdot 2\pi f_{sc} t + \pi\theta)\end{aligned} \tag{4}$$

Here, too, the second term of the right side of the bottom equation is removed from Equation (4) via low-pass-filtering (not represented), which thereby results in a new R-Y value as shown in Equation (5).

$$(R-Y)' = -A \sin(\pi - \theta) \tag{5}$$

Here, only the sine component appears.

In Equations (3) and (5), where the phase difference between the signals to be multiplied by the burst signal, i.e., the first and second carrier signals, do not exist so that the $\theta$ becomes zero, the low-pass-filtered R-Y and B-Y color difference signals become:

$$\begin{aligned}B - Y &= A\cos\theta \\ &= A\end{aligned} \tag{6}$$

$$\begin{aligned}R - Y &= -A\sin\theta \\ &= 0\end{aligned} \tag{7}$$

That is, in the case of no phase difference, just the B-Y signal is selected for obtaining the amplitude value of the burst signal.

However, since $\theta$ is not zero if the phases of demodulated carrier chrominance signal and the burst signal are not identical, the B-Y and R-Y components have a phase difference as much as angle θ, respectively. Accordingly, an accurate burst signal amplitude would be difficult to determine.

A detailed description of the method and apparatus according to the invention will now be provided.

Figure 1:
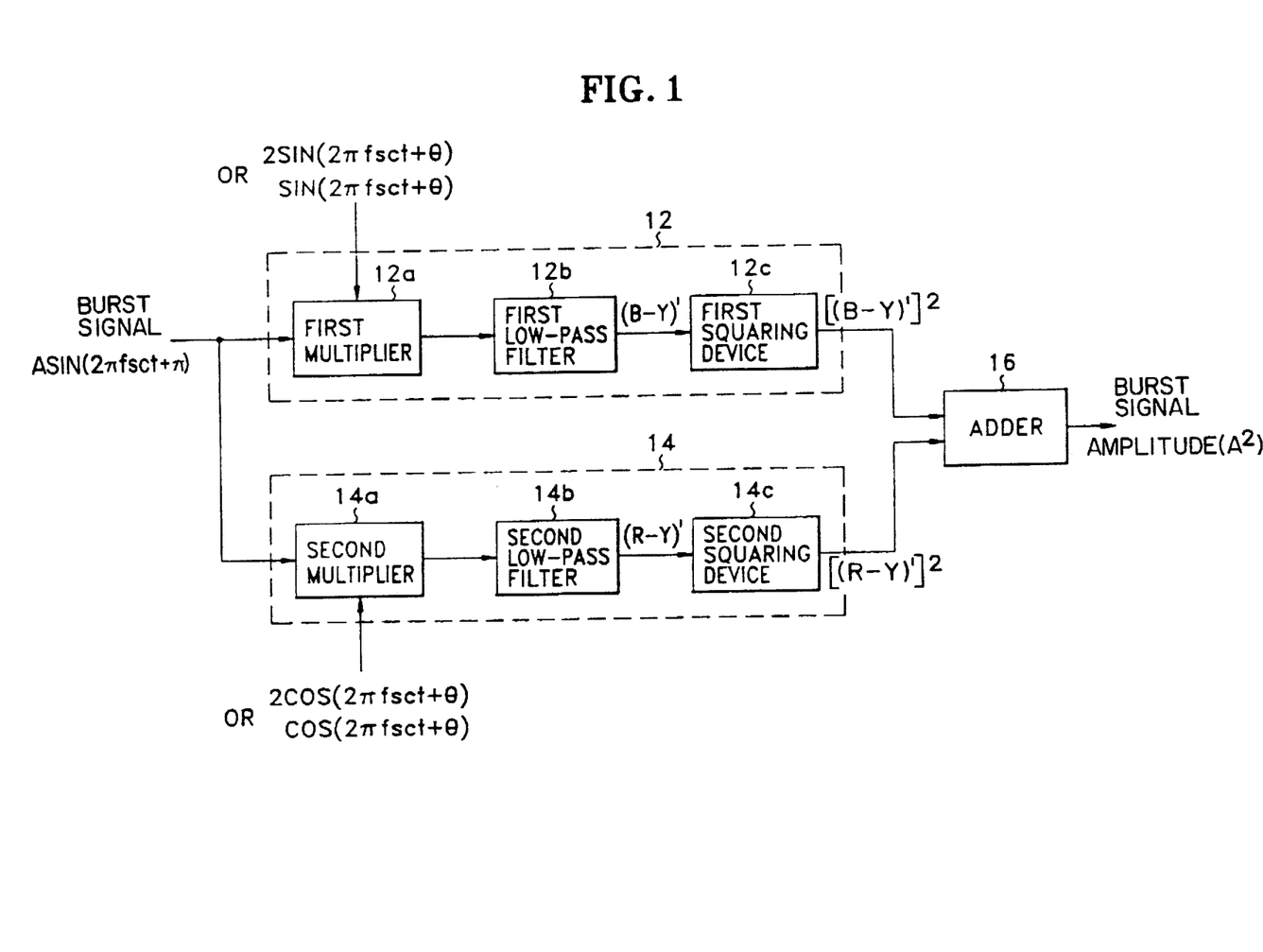
FIG. 1 is a block diagram of an apparatus for detecting color burst signal amplitude, which is useful in explaining the method of the present invention.

FIG. 1 is a block diagram of the amplitude detecting apparatus suitable for performing the method for detecting color burst signal amplitude according to the present invention. Referring to FIG. 1, the amplitude detecting apparatus comprises a first chrominance-reference-signal-amplitude detector 12 for receiving the burst signal extracted from the input video signal to thereby produce the low-pass-filtered and squared signal on a B-Y axis; a second chrominance-reference-signal-amplitude detector 14 for receiving the burst signal extracted from the input video signal to thereby produce the low-pass-filtered and squared signal on an R-Y axis, and an adder 16 for receiving the outputs of the first and second amplitude detectors 12 and 14 and summing them.

First amplitude detector 12 includes a first multiplier 12a for multiplying the burst signal by a first carrier signal which advantageously can be a sine wave having the same frequency as that of the burst signal, a first low-pass filter 12b for removing the components higher than the second harmonic from the output signal of first multiplier 12a, and a first squaring device 12c receiving the output signal of first low-pass filter 12b and providing a low-pass-filtered and squared signal on the B-Y axis.

Preferably, second amplitude detector 14 includes a second multiplier 14a for multiplying the burst signal by a second carrier signal which advantageously can be a cosine wave having the same frequency as that of the burst signal, a second low-pass filter 14b for removing the components higher than the second harmonic from the output signal of second multiplier 14a, and a second squaring device 14c receiving the output signal of second low-pass filter 14b for providing a low-pass-filtered and squared signal on the R-Y axis.

Adder 16 adds the low-pass-filtered and squared signal on the B-Y axis with respect to the burst signal output from first chrominance reference signal amplitude detector 12 to the low-pass-filtered and squared signal on the R-Y axis with respect to the burst signal output from second chrominance reference signal amplitude detector 14.

The operation of the circuitry illustrated in FIG. 1 will be described in more detail while additionally referring to FIG. 2 and FIGS. 3A and 3B. In FIG. 1, first multiplier 12a receives the burst signal and multiplies it by the first carrier signal for demodulation, which carrier signal is expressed as $2 \sin(2\pi f_{sc} t+\theta)$. The burst signal has a sinusoidal waveform which can be expressed as $A \sin(2\pi f_{sc} t+\pi)$, as in shown Equation (1). The output signal of first multiplier 12a has a form indicated by Equation (2). Low-pass filter 12b obtains the signal on the B-Y axis which is expressed as a cosine component, as in shown Equation (3).

First squaring device 12c performs the squaring of the low-pass-filtered signal to produce a $(B-Y)^2$ signal. A first squaring device advantageously can be embodied, in one exemplary application, by means of a logic circuit using a full adder and a multiplexer.

Preferably, second multiplier 14a multiplies the burst signal $A \sin(2\pi f_{sc} t+\pi)$ by a second carrier signal for demodulation which carrier signal is expressed as $2 \cos(2\pi f_{sc} t+\theta)$. Second low-pass filter 14b filters the signal expressed by Equation (4) from the output of second multiplier 14a. Thus, the signal expressed, as shown in Equation (5), is input to second squaring device 14c. Second squaring device 14c advantageously performs the squaring operation on its input signal to produce a $(R-Y)^2$ signal.

The $(B-Y)^2$ signal of first multiplier 12c and the $(R-Y)^2$ signal of second multiplier 14c are combined by adder 16, so that the amplitude of the burst signal advantageously can be determined.

Such operation can be explained with reference to Equations (3) and (5) as follows:

$$(R-Y)^2 + (B-Y)^2 = (A\cos\theta)^2 + (-A\sin\theta)^2 \quad (8)$$
$$= A^2$$

Equation (8) shows that the A-squared value is obtained without respect to the phase error θ, which always corresponds to the level of the burst signal. Since the squared value of color burst signal level A is obtained using the amplitude detecting method according to the present invention, it would seem to be advantageous to perform a further square-root operation. However, in the ACC circuit, the nominal standard of the burst signal is judged by its relative amplitude in order to control the color saturation at a fixed amplitude, so that the $A^2$ value itself can advantageously be used without further processing.

Moreover, as for first multiplier 12a and second multiplier 14a, it does not matter which initial amplitude value is given as the amplitude value of the signals $\sin(2\pi f_{sc} t+\theta)$ and $\cos(2\pi f_{sc} t+\theta)$, which signals are then multiplied by the burst signal, since the resulting burst level will vary proportionally to the initial amplitude value. In an exemplary case, two is used as the amplitude, for convenience.

Figure 2:
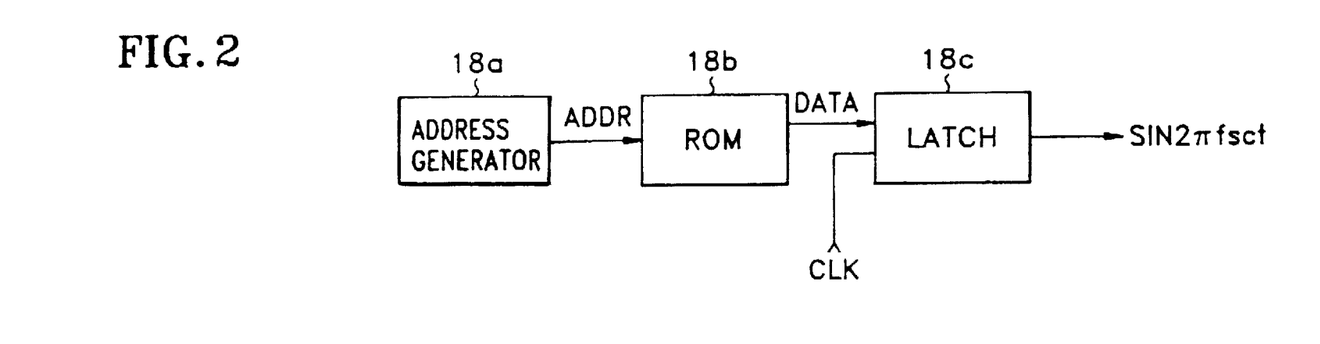
FIG. 2 is a block diagram showing a carrier generator for producing a carrier signal.

FIG. 2 is a block diagram of a carrier generator producing the first and second carrier signals. An arbitrary-frequency clock signal CLK is adopted so that, for example, a sine wave signal with its carrier signal $\sin(2\pi f_{sc} t)$ can be described. When $f_{sc}/f_s=2/5$, where $f_{sc}$ is the frequency of the carrier signal and $f_s$ is the frequency of the sampling clock signal, the signal $\sin(2\pi f_{sc} t)$, whose frequency is 2 MHz, is sampled at a 5 MHz sampling frequency, as shown in FIG. 3A.

Figure 3A:
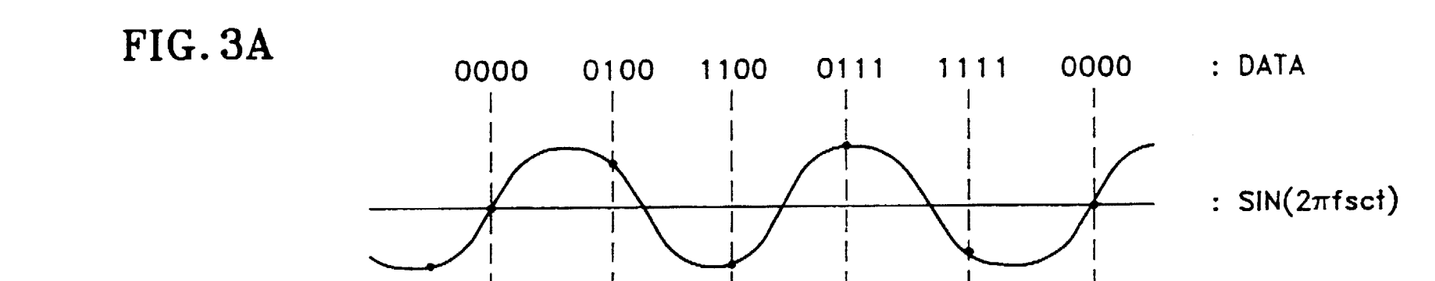

The sine wave signal of FIG. 3A can be digitized such that the amplitude of the signal at the sampling points are presumably stored in the ROM 18b, and then read in a sequence. At this point, ROM 18b has five addresses, 000, 001, 010, 011 and 100, and has the data values corresponding to $\sin(0)$, $\sin(2\pi/5)$, $\sin(2\pi 2/5)$, $\sin(2\pi 3/5)$ and $\sin(2\pi 4/5)$ sequentially stored in respective addresses.

The data can be expressed using any four bits. Here, for example, $\sin(0)=0000$, $\sin(2\pi/5)=0111$, $\sin(2\pi 2/5)=0100$, $\sin(2\pi 3/5)=1111$ and $\sin(2\pi 3/5)=1100$.

Therefore, ROM 18b can be composed as shown by Table 1:

TABLE 1

| ADDRESS | DATA |
|---------|------|
| 000 | 0000 |
| 001 | 0111 |
| 010 | 0100 |
| 011 | 1111 |
| 100 | 1100 |

Here, the data stored in ROM 18b are output via latch 18c.

Figure 3B:
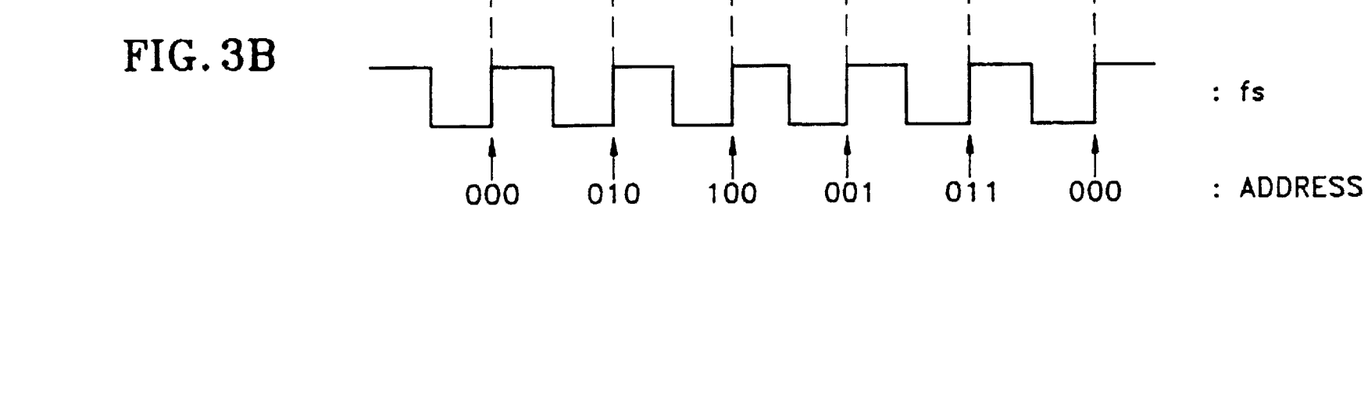
FIG. 3B shows the addresses produced by being synchronized by a sampling clock.

That is, to generate a wave $\sin(2\pi f_{sc} t)$ according to the sampling frequency $f_s$ in an exemplary case where $f_s/f_{sc}=2/5$, the address is generated by address generator 18a for accessing ROM 18b by the increase of two steps at each sampling, for example, 000, 010, 100, 001, 011, 000, . . . as shown in FIG. 3B. Here, the read out data is $\sin(2\pi f_{sc} t)$.

The sin($2\pi f_{sc}t$) signal is produced using an arbitrary clock frequency providing the desired relationship between the sampling clock signal's frequency $f_s$ and the frequency $f_{sc}$, in which the value of $f_s$ is equal to the number of addresses of ROM 18b and a signal within one period is sampled at a uniform interval so as to be stored in ROM 18b.

FIGS. 3A and 3B and Table 1 provide only a brief explanation of carrier signal generation. It should be noted that when an actual sin($2\pi f_{sc}t$) signal is sampled, the address obtained by address generator 18a is one in which the $f_s$ value is added at each increase (or decrease) of the sampling clock signal. Thus, if, in the ratio $f_s/f_{sc}$, the numerator $f_s$ exceeds the denominator $f_{sc}$, a modulo operation advantageously can be executed such that the denominator is subtracted from the numerator and the remainder can be used as the address.

Moreover, since cos($2\pi f_{sc}t$) signal is equal to sin($2\pi f_{sc}t$+ $\pi/2$), the data can be read out using the same method while varying the address sequence generated by address generator 18a.

Figure 4:
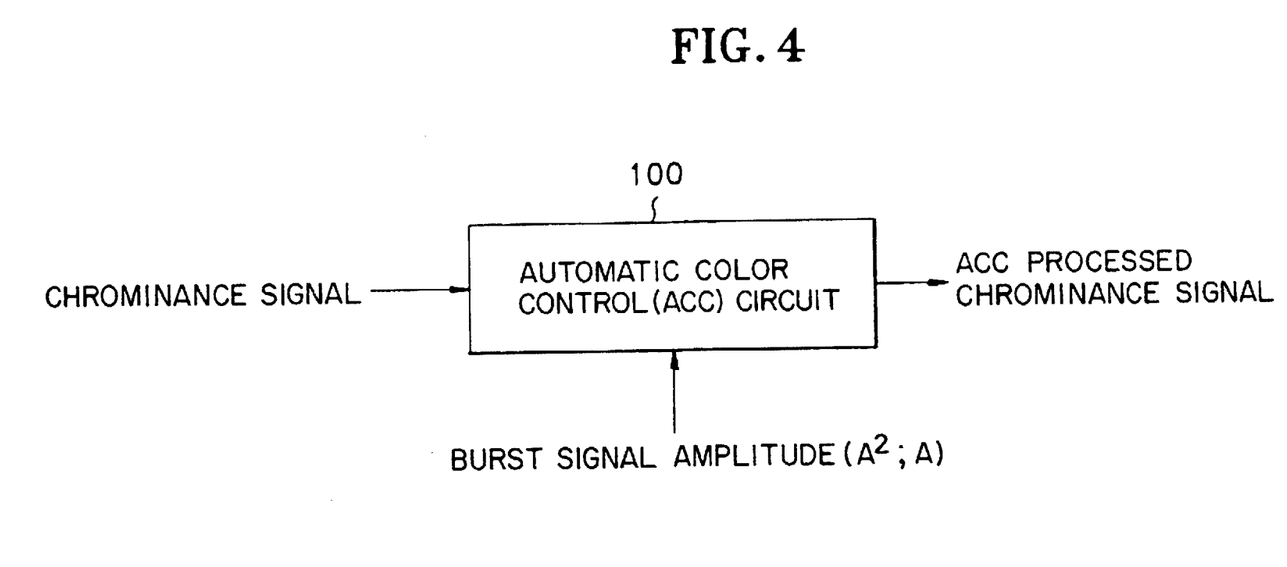
FIG. 4 shows an automatic color controller.

A better understanding of the ACC circuit according to the present invention can be had by referring to FIG. 4. The ACC circuit preferably reduces the gain factor of the input chrominance signal, using the burst signal level, e.g., one of $A^2$ or A, extracted via the color burst signal amplitude detecting apparatus shown in FIG. 1. When the level of the color burst signal becomes greater than a nominal level, or vice versa, the ACC circuit varies, e.g., increases, the gain factor of the chrominance signal being input, so that the chrominance signal can be maintained at a constant level.

Figure 5:
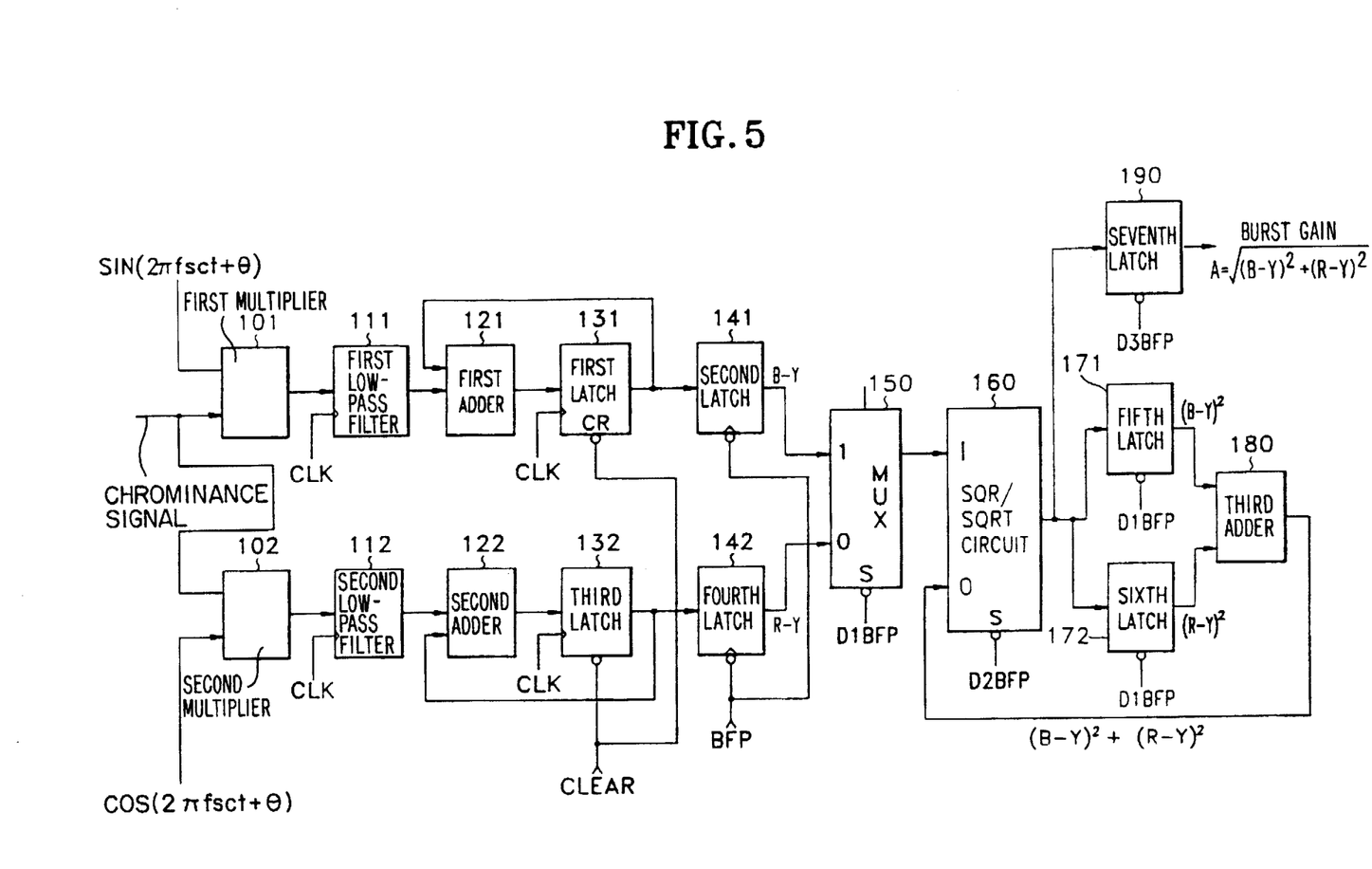
FIG. 5 is a circuit diagram of an apparatus for detecting color burst signal amplitude according to another embodiment of the present invention.

FIG. 5 is a circuit diagram showing the apparatus for detecting color burst signal amplitude according to an embodiment of the present invention. Referring to FIG. 5, the signal entering a first multiplier 101 is a chrominance signal having been separated from the luminance signal. The chrominance signal can be represented as follows:

$$C = C_b \cos(2\pi f_{sc}t) + C_r \sin(2\pi f_{sc}t) \qquad (9)$$

where C is the chrominance signal, $C_b$ is the B-Y signal and $C_r$ is the R-Y signal.

Preferably, first multiplier 101 multiplies the burst signal loaded on the chrominance signal by the demodulated carrier signal 2 sin($2\pi f_{sc}t$), where the burst signal is expressed by Equation (1). The output of first multiplier 101 is represented by Equation (2).

A first low-pass filter 111 receives the signal output from first multiplier 101, and passes only the base-band portion thereof. Thereafter, only the B-Y signal expressed as Equation (3) is input to the first input node of a first adder 121. The output of first adder 121 is latched at a first latch 131, which then feeds its output back to the second input node of first adder 121. First latch 131 is latched for the "high" interval of a clear signal and is thereby cleared at the falling edge thereof.

Figure 6A:
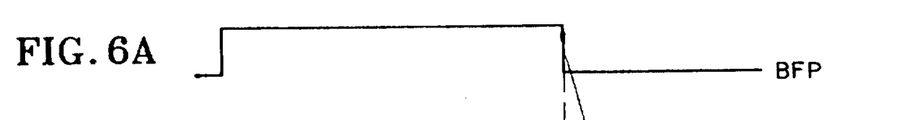
FIGS. 6A–6J constitute an operational timing diagram for the apparatus for detecting color burst signal amplitude as shown in FIG. 5.

A second latch 141 receives the burst pulse (BFP), shown in FIG. 6A, and latches the output of first latch 131 for the burst period.

Meanwhile, the burst signal loaded on the chrominance signal advantageously is input to a second multiplier 102, which signal is represented by Equation (1), and second multiplier 102 multiplies the burst signal by the demodulated second carrier signal 2 cos($2\pi f_{sc}t$).

Figure 6B:
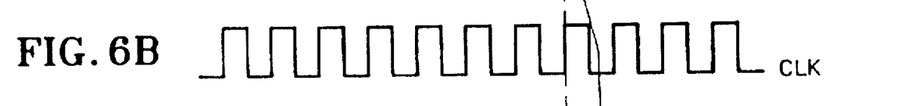
Figure 6C:
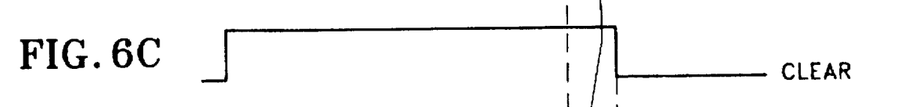

A second low-pass filter 112 passes only the base-band portion of the output of second multiplier 102, expressed as Equation (2). The R-Y component, represented by Equation (5), is input to the first input node of second adder 122. Second adder 122 adds the R-Y color difference signal component to the output fed back from a third latch 132 during the "high" interval of the clear signal of FIG. 6C, and third latch 132 latches the result. It should be noted that the waveform of the clock signal CLK which is input to first low-pass filter 111, first latch 131, second low-pass filter 112 and third latch 132 is shown in FIG. 6B.

A fourth latch 142 receives as a clock pulse, i.e., the burst pulse BFP, which is shown in FIG. 6A, and latches the output of third latch 132 for the burst period.

Figure 6D:
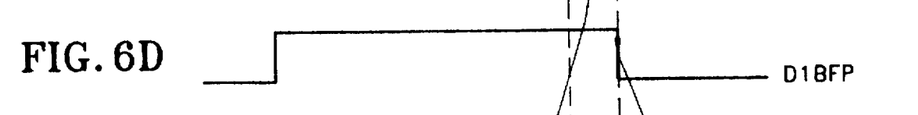

Upon receipt of a signal D1BFP of FIG. 6D, which preferably is the BFP signal (FIG. 6A) delayed by one clock period, via a selection node S, a multiplexer 150 selects the output B-Y of second latch 141 for the "high" interval (logic "1") of FIG. 6D after the burst signal (FIG. 6A) changes to "low" state, and selects the output R-Y of fourth latch 142 for the "low" interval (logic "0") of FIG. 6D after changing from "high" (logic "1") to "low" (logic "0").

Figure 6E:
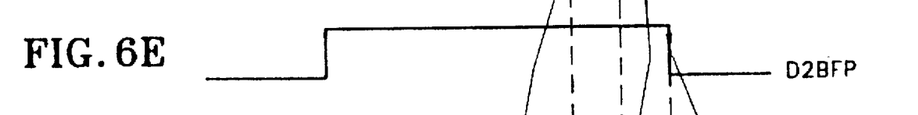

Square/square-root (SQR/SQRT) circuit 160 performs a squaring operation when the signal, input via selection control node S, is "1," and performs a square-root operation when the signal is "0." Here, the signal input at selection control node S is a signal D2BFP of FIG. 6E, which is the BFP signal delayed by two clock periods. SQR/SQRT circuit 160 operates as a squaring device for the "high" interval of the signal of FIG. 6E after the signal shown in FIG. 6D changes to "low" (logic "0").

When SQR/SQRT circuit 160 operates as a squaring device, it squares the output signal B-Y, if any, of multiplexer 150 and temporarily stores the result in a fifth latch 171, or squares the output signal R-Y, if any, of multiplexer 150 and temporarily store the result in a sixth latch 172. The waveforms of (B-Y) and (R-Y) signals are shown in FIG. 6G, the waveform of $(B-Y)^2$ is shown in FIG. 6H, and the waveform of $(R-Y)^2$ is shown in FIG. 6I.

Preferably, a third adder 180 sums the outputs stored in fifth and sixth latches 171 and 172, respectively, and sends the result to the "0" node of SQR/SQRT circuit 160. SQR/SQRT circuit 160 operates as a square-root device for the "low" interval of the signal shown in FIG. 6E, after the signal changes from "high" to "low."

Figure 6F:
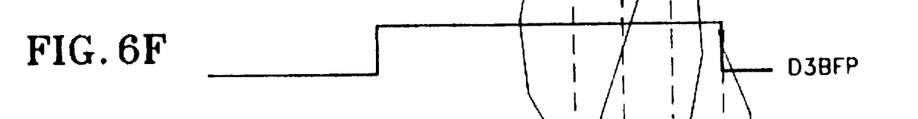
Figure 6G:
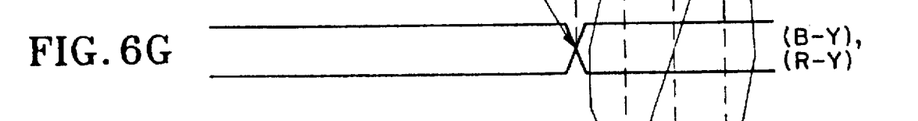
Figure 6H:
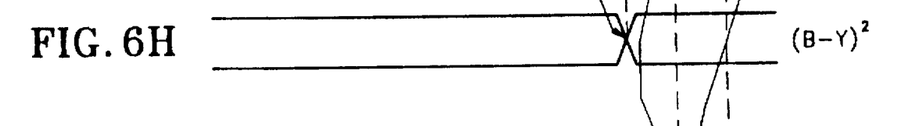
Figure 6I:
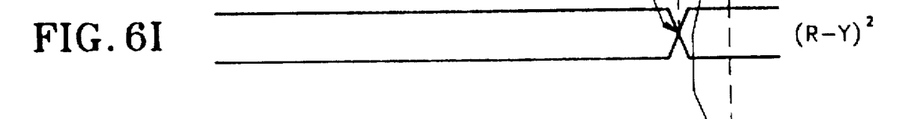
Figure 6J:
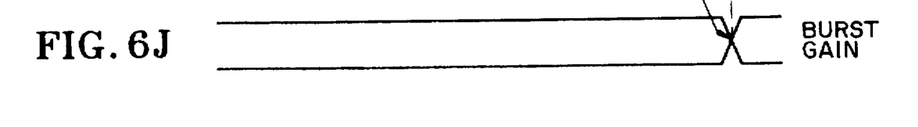

When SQR/SQRT circuit 160 operates as a square-root device, it obtains the square root of the signal $(B-Y)^2+(R-Y)^2$ input through its input node "0." The moment that a D3BFP signal goes from "high" to "low" as shown in FIG. 6F, a seventh latch 173 latches the output of SQR/SQRT circuit 160 so as to produce the desired burst level, which is represented in FIG. 6J.

Figure 7:
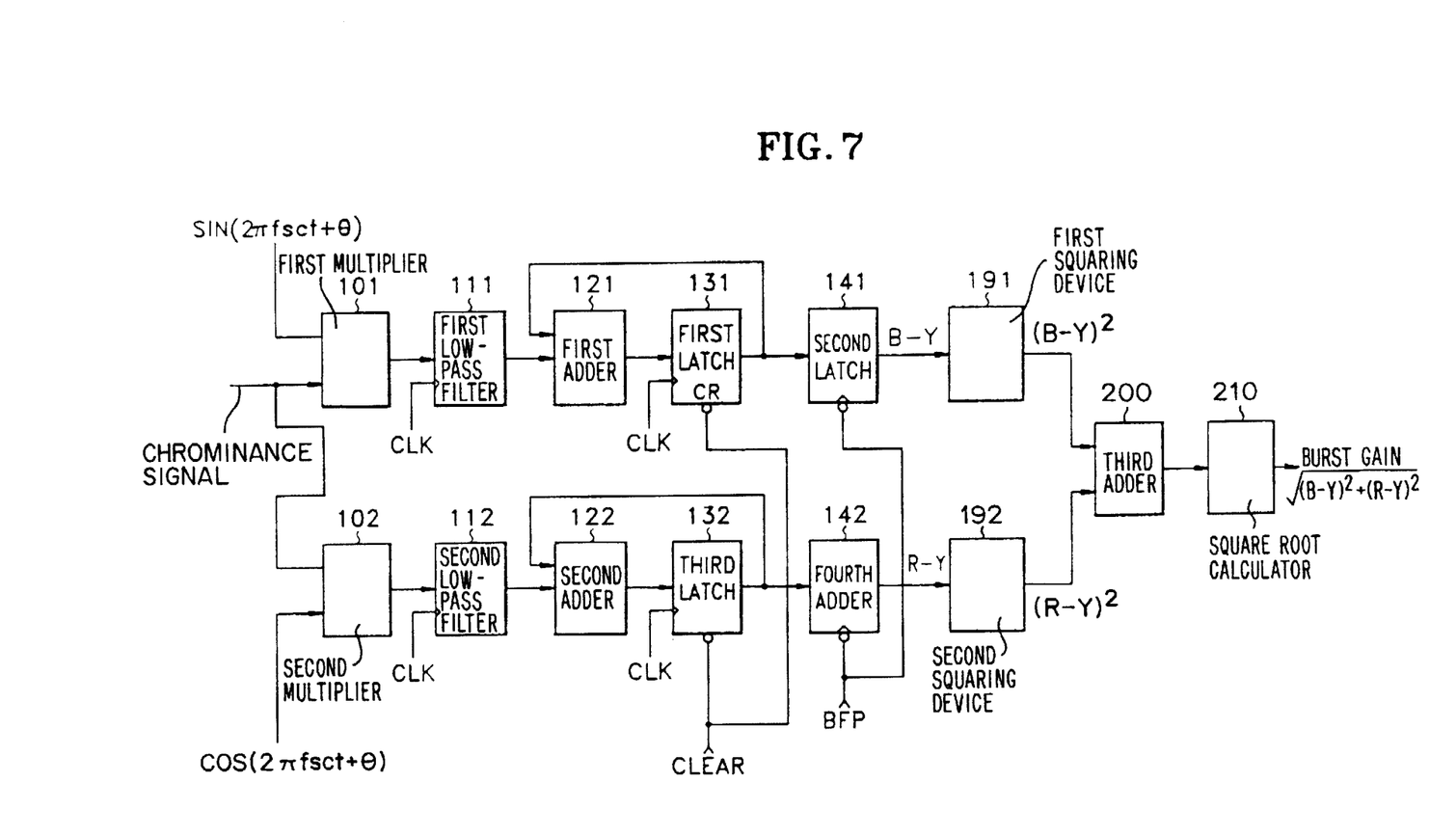
FIG. 7 is a circuit diagram of an apparatus for detecting color burst signal amplitude according to yet another embodiment of the present invention.

FIG. 7 is a block diagram of the apparatus for detecting color burst signal amplitude according to yet another embodiment of the present invention. Referring to FIG. 7, wherein like components are denoted by like reference numerals, a detailed description of the construction and operation will be omitted in the interest of brevity. Only the differences between FIGS. 4 and 7 will be discussed.

A first squaring device 191 squares the output B-Y latched by second latch 141, while a second squaring device 192 squares the latched output of a fourth latch 142. Also, a third adder 200 adds the output $(B-Y)^2$ of first squaring device 191 to the output $(R-Y)^2$ of second squaring device 192, and sends the result to square-root calculator 210. A square-root calculator 210 produces a burst level A, where $A=[(B-Y)^2+(R-Y)^2]^{1/2}$.

The squaring/square-root circuit, the squaring device and the square-root device shown in FIGS. 5 and 7 are disclosed by Kai Hwang (see "Computer Arithmetic Principles Architecture and Design," pp.359–366). Accordingly, since the integrated squaring/square-root device 160 can be constructed to provide both squaring and square-root operations, it is more effective than a squaring device and a square-root calculator which are separately constructed.

As described above, the method for detecting color burst signal amplitude and the corresponding apparatus according to the present invention permits the B-Y and R-Y color difference signals of the input burst signal to be obtained using a carrier signal having cosine and sine components. The amplitude, based on the two color difference signals, is calculated to obtain the level of the burst signal. Therefore, accurate burst signal amplitudes can be obtained regardless of the phase difference between the burst signal and the demodulated carrier signal.

The method for detecting color burst signal amplitude and the corresponding apparatus advantageously can be applied not only to burst signal amplitude detection in a color image processing apparatus, but also to detecting the level (maximum instantaneous value) of a signal having a fixed-level sinusoidal waveform similar to that of the burst signal.

It should also be understood that the present invention advantageously can be embodied for a variety of broadcast formats, including NTSC and PAL video systems, which vary in carrier frequency $f_{sc}$.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention. Accordingly, the scope of the present invention should be determined from the attached claims and not from exemplary embodiments.

What is claimed is:

1. A method for detecting color burst signal amplitude for controlling level of a chrominance signal based on said signal amplitude of a burst signal loaded thereon, comprising the steps of:
   (a) separating said burst signal into a first chrominance reference signal and a second chrominance reference signal having a predetermined phase difference with respect to each other, using a carrier signal having a predetermined frequency;
   (b) generating first and second squared components of said first and second chrominance reference signals, respectively, each of said reference signals being separated in said step (a); and
   (c) generating an amplitude value of said burst signal in response to a composite signal of said squared components obtained from said step (b).

2. A method for detecting color burst signal amplitude, comprising the steps of:
   (a) low-pass-filtering a burst signal so as to obtain a sinusoidal first chrominance reference signal on an R-Y axis and a sinusoidal second chrominance reference signal on a B-Y axis;
   (b) generating square first and second values of said low-pass-filtered first and second chrominance reference signals, respectively; and
   (c) determining amplitude of said burst signal based on addition of said first value to said second value.

3. An apparatus for detecting color burst signal amplitude for controlling the level of a chrominance signal based on a respective level of a burst signal loaded thereon, comprising:
   a first circuit separating said burst signal into a first chrominance reference signal and a second chrominance reference signal having a predetermined phase difference with respect to each other, using a carrier signal having a predetermined frequency;
   a second circuit providing squared components of said first and second chrominance reference signals which are separated by said first circuit; and
   a third circuit providing an amplitude value of said burst signal based on a composite signal of said squared components.

4. The apparatus for detecting color burst signal amplitude as recited in claim 3, wherein said first circuit multiplies the burst signal by a first carrier signal and a second carrier signal which respectively are expressed as a sine wave and a cosine wave, each having the same frequency as that of said burst signal, to thereby permit separation of said first and second chrominance reference signals.

5. The apparatus for detecting color burst signal amplitude as recited in claim 3, wherein said third circuit outputs as the amplitude value of the burst signal the summation signal of the squared components of said first and second chrominance reference signals.

6. The apparatus for detecting color burst signal amplitude as recited in claim 3, wherein said third circuit outputs as the amplitude value of the burst signal a square root of a summation of the squared components of said first and second chrominance reference signals.

7. An apparatus for detecting color burst signal amplitude for controlling the level of a chrominance signal based on a respective level of a burst signal loaded thereon, said apparatus comprising:
   a first chrominance-reference-signal-amplitude detector producing a squared signal of a sinusoidal first chrominance reference signal of the burst signal extracted from an input image signal, said first chrominance reference signal being obtained according to a first carrier signal;
   a second chrominance-reference-signal-amplitude detector producing a squared signal of a sinusoidal second chrominance reference signal of the burst signal extracted from the input image signal, said second chrominance reference signal having a predetermined phase difference with respect to said first chrominance reference signal and being obtained according to a second carrier signal which has a predetermined phase difference with respect to said first carrier signal; and
   an amplitude calculator providing an amplitude value of said burst signal based on a combined signal generated from said first and said second chrominance-reference-signal-amplitude detectors.

8. The apparatus for detecting color burst signal amplitude as recited in claim 7, wherein said first chrominance-reference-signal-amplitude detector comprises:
   a first multiplier for multiplying said burst signal by a sine wave defining said a first carrier signal having the same frequency as that of said burst signal;
   a first low-pass filter for passing a lower band component on a output signal of said first multiplier; and
   a first squaring device for squaring the output signal of said first low-pass filter to thereby produce a low-pass-filtered signal of a first chrominance signal axis.

9. The apparatus for detecting color burst signal amplitude as recited in claim 8, wherein, when an instantaneous value of the input burst signal is $A \sin(2\pi f_{sc} t+\pi)$, an instantaneous value of said sine wave is $2 \sin(2\pi f_{sc} t+\theta)$.

10. The apparatus for detecting color burst signal amplitude as recited in claim 7, wherein said second chrominance-reference-signal-amplitude detector comprises:

a second multiplier for multiplying said burst signal by a cosine wave defining said second carrier signal having the same frequency as that of said burst signal;

a second low-pass filter for passing a lower band component in an output signal of said second multiplier;

a second squaring device for squaring an output signal of said second low-pass filter to thereby produce a low-pass-filtered signal on a second chrominance signal axis.

11. The apparatus for detecting color burst signal amplitude as recited in claim 10, wherein, when an instantaneous value of the burst signal is $A \sin(2\pi f_{sc}t+\pi)$, an instantaneous value of said cosine wave is $2 \cos(2\pi f_{sc}t+\theta)$.

12. The apparatus for detecting color burst signal amplitude as recited in claim 7, wherein said amplitude calculator comprises an adder for adding the squared first chrominance reference signal provided by said first chrominance-reference-signal-amplitude detector to the squared second chrominance reference signal provided said second chrominance-reference-signal-amplitude detecting means.

13. An apparatus for detecting color burst signal amplitude for controlling the level of a chrominance signal based on the level of a burst signal loaded thereon, said apparatus comprising:

a first multiplier for multiplying the burst signal loaded on an input chrominance signal by a first carrier signal comprising a sine wave having the same frequency as that of said burst signal;

a first low-pass filter for passing lower band components of an output signal of said first multiplier;

first latch means for latching a first chrominance reference signal output from said first low-pass filter for a predetermined burst period;

a second multiplier for multiplying said burst signal by a second carrier signal having a predetermined phase difference with respect to said first carrier signal;

a second low-pass filter for passing lower band components of an output of said second multiplier;

second latch means for latching said a second chrominance reference signal output from said second low-pass filter, for a predetermined burst period;

a selector for selecting one of an output of said first latch means and, an output of said second latch means;

a circuit for squaring a selected signal provided by said selector to a first input node of said circuit, and performing a square-root operation on the selected signal provided to a second input node of said circuit, to thereby output the amplitude level of said burst signal; and an adder for adding the squared first and second chrominance reference signals from said circuit, to thereby supply said second input node of circuit with a summed result.

14. An apparatus for detecting color burst signal amplitude for controlling the level of a chrominance signal based on a respective level of a burst signal loaded thereon, said apparatus comprising:

a first multiplier for multiplying the burst signal loaded on an input chrominance signal by a first carrier signal defined by a sine wave having the same frequency as that of said burst signal;

a first low-pass filter for passing lower band components of an output of said first multiplier;

a first latch latching a first chrominance reference signal output from said first low-pass filter for a predetermined burst period;

a second multiplier for multiplying said burst signal by a second carrier signal having a predetermined phase difference with respect to said first carrier signal;

a second low-pass filter for passing lower band components of an output of said second multiplier;

a second latch latching a second chrominance reference signal output from said second low-pass filter for the predetermined burst period;

a first calculator for respectively squaring outputs of said first and second latches; and a second calculator taking a square-root of a sum of said outputs of said first calculator.

15. A gain detecting apparatus receiving a sine wave and producing its maximum instantaneous value, comprising:

a first signal generator for receiving a carrier signal having a sinusoidal waveform and producing a first squared signal of a band width limited sine component thereof;

a second signal generator for receiving said carrier signal and producing a second squared signal of a band width limited cosine component thereof; and a gain calculator for receiving sinusoidal output signals of respective said first and said second signal generators and combining said output signals so as to provide a square of maximum instantaneous value of said carrier signal.

16. The gain detecting apparatus as recited in claim 15, wherein said first signal generator comprises:

a first multiplier for multiplying said carrier signal by a sine wave having a frequency of said carrier signal;

a first low-pass filter for removing components higher than a second harmonic from an output signal of said first multiplier;

a first squaring calculator for squaring a first low-pass filter output signal to thereby provide a low-pass-filtered squared signal on a first reference signal axis.

17. The gain detecting apparatus as recited in claim 16, wherein, when an instantaneous value of the input carrier signal is $A \sin(2\pi f_{sc}t+\pi)$, an instantaneous value of said sine component is $2 \sin(2\pi f_{sc}t+\theta)$.

18. The gain detecting apparatus as recited in claim 15, wherein said second signal generator comprises:

a second multiplier for multiplying said carrier signal by a cosine wave having the carrier signal frequency;

a second low-pass filter for removing components higher than a second harmonic wave from an output signal of said second multiplier; and a second squaring calculator for squaring a second low-pass filter output signal to thereby provide a low-pass-filtered squared signal on a second reference signal axis which is 90° out of phase with respect to a first reference signal axis.

19. The gain detecting apparatus as recited in claim 18, wherein, when an instantaneous value of the input carrier signal is $A \sin(2\pi f_{sc}t+\pi)$, an instantaneous value of said cosine component is $2 \cos(2\pi f_{sc}t+\theta)$.

20. The gain detecting apparatus as recited in claim 15, wherein said gain calculator comprises an adder for adding the first squared signal with the second squared signal.

* * * * *